(No Model.)

G. W. THOMAS.
WHEEL HUB.

No. 266,400. Patented Oct. 24, 1882.

WITNESSES
Wm. A. Skinkle
Jos. S. Palmer

INVENTOR
George W. Thomas
By his Attorney
Baldwin, Hopkins & Peyton

UNITED STATES PATENT OFFICE.

GEORGE W. THOMAS, OF TOLEDO, OHIO.

WHEEL-HUB.

SPECIFICATION forming part of Letters Patent No. 266,400, dated October 24, 1882.

Application filed August 24, 1882. (No model.)

*To all whom it may concern:*

Be it known that I, GEORGE W. THOMAS, of Toledo, in the county of Lucas and State of Ohio, have invented certain new and useful Improvements in Wheel-Hubs, of which the following is a specification.

My invention more especially relates to wheelbarrow wheel-hubs, but may be applied to other wheels; and it consists in a metallic face-plate, axle-bearing, and collar formed in a single piece to be applied and secured independently to each end of the hub.

Figure 1:
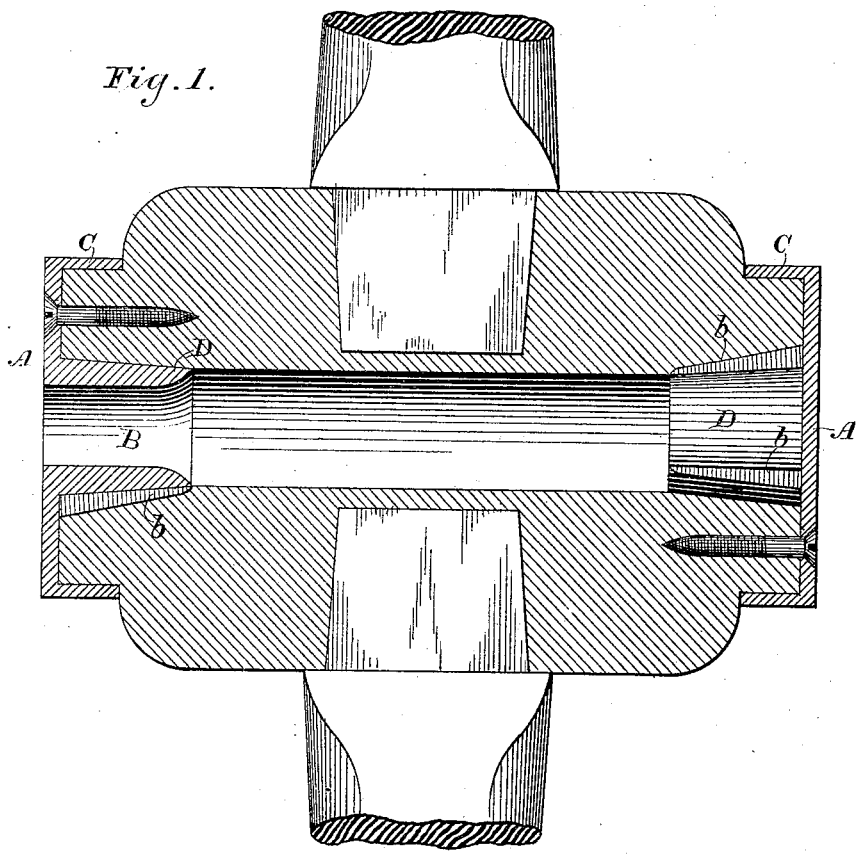
Figure 2:
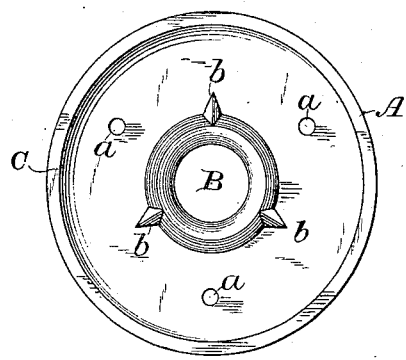

In the accompanying drawings, illustrating my invention, Figure 1 is a longitudinal central section through a hub, showing my improvement applied thereto; and Fig. 2 is an inner face view of my improved hub-cap.

The cap or combined face-plate, bearing, and collar illustrated in Fig. 2 is formed of metal and is preferably cast in one piece.

A is the face-plate or wearing-surface, which covers the end of the hub.

B is a central opening in the face-plate, through which the axle extends.

*a a a* are screw-holes for the screws, which attach the plate to the hub.

C is an annular flange or collar, formed on the periphery of the face-plate, which fits over the end of the hub and firmly clamps it.

D is a tubular extension of the plate A, preferably slightly conical, and projecting into the hub-opening to form the bearing for the axle, the exterior surface being provided with feathers *b b b*, and the bore being a continuation of the central opening, B.

Instead of making the screw-holes in the face-plate, they may be made in the collar.

In Fig. 1 my device is shown as applied to a wheelbarrow-hub. On each end the conical tubular extension is driven into the bore of the hub, the feathers *b b b* taking firm hold, so as to keep the extension from turning, the collar at the same time passing around the end of the hub in the socket, so that a close fit is made without danger of splitting. Screws are driven through the holes *a a a*, which securely attach the cap to the hub. The tubular extension D forms a bearing for the axle at each end of the hub; but, if desired, it may be made long enough to extend half-way through, so that the two will entirely fill the bore of the hub. I prefer, however, to have them extend in only a short distance, the bore of the hub being preferably made a little larger or conical at the ends to receive them.

The axle is to be rigidly attached to the frame of the wheelbarrow. The wheel is built up around the hub in any well-known way.

Hubs made according to my plan may be produced with great facility and economy. The caps are cast complete at a small expense, and are applied by merely driving them in place and putting in the screws. They are very light, bind the end of the hub firmly, prevent wear, and afford a good bearing for the axle.

I claim as my invention—

1. The combination of the hub and a cap independently secured upon each end thereof, said caps each consisting of a collar, a face-plate, and a tubular extension or axle-bearing extending into the hub-body, substantially as and for the purpose set forth.

2. The cap cast in a single piece consisting of the face-plate having the screw-holes *a a a* therein, the collar, and the short tubular extension or axle-bearing having the feathers *b b b*, and adapted to extend part way through the hub, substantially as set forth.

3. The combination of the hub and a combined face-plate A, collar C, and conical tubular extension or axle-bearing D, extending into the hub-body, and independently secured to each end of the hub, substantially as set forth.

In testimony whereof I have hereunto subscribed my name this 21st day of August, A. D. 1882.

GEO. W. THOMAS.

Witnesses:
C. AUCHARD,
R. W. SWAIN.